Patented Sept. 12, 1922.

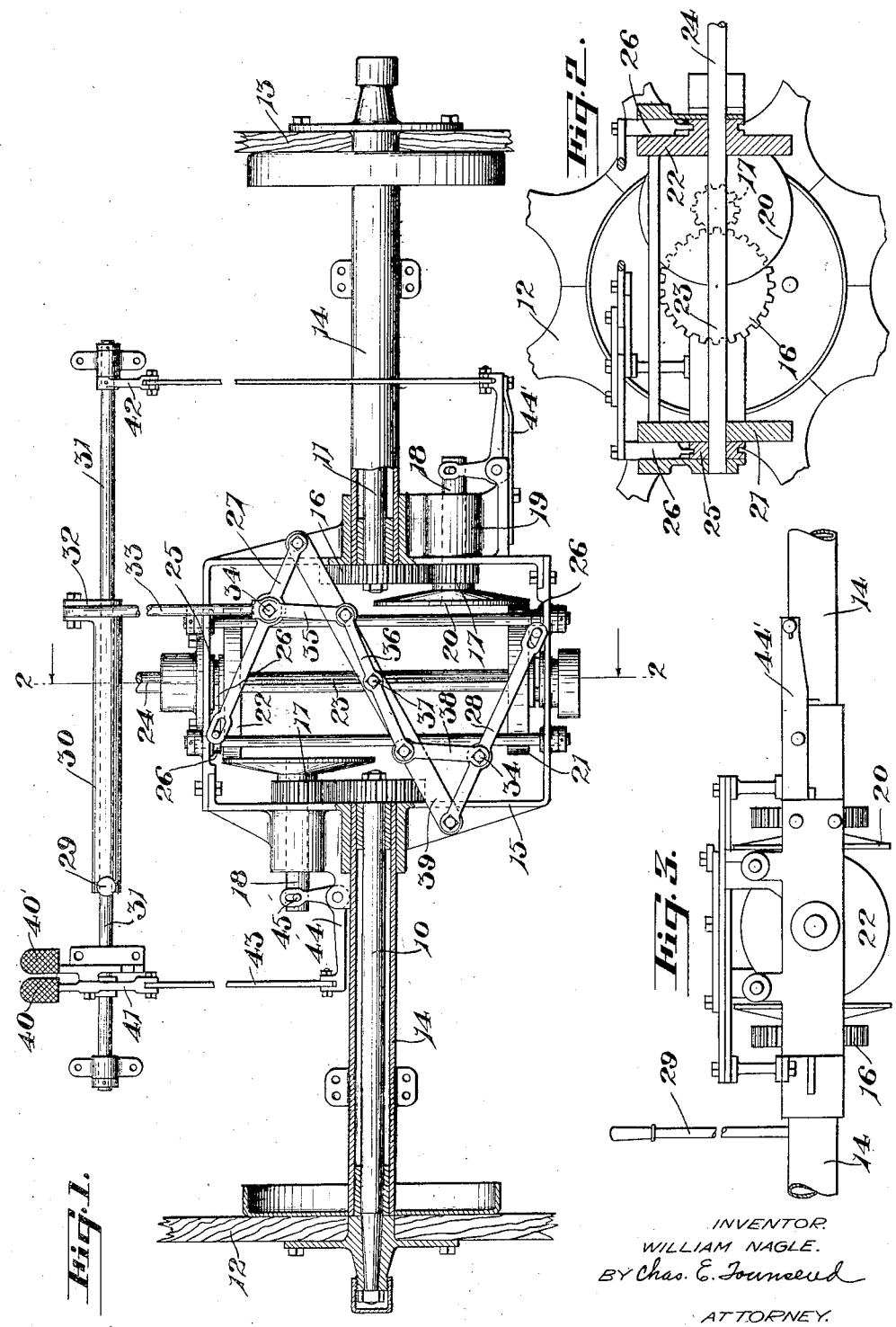

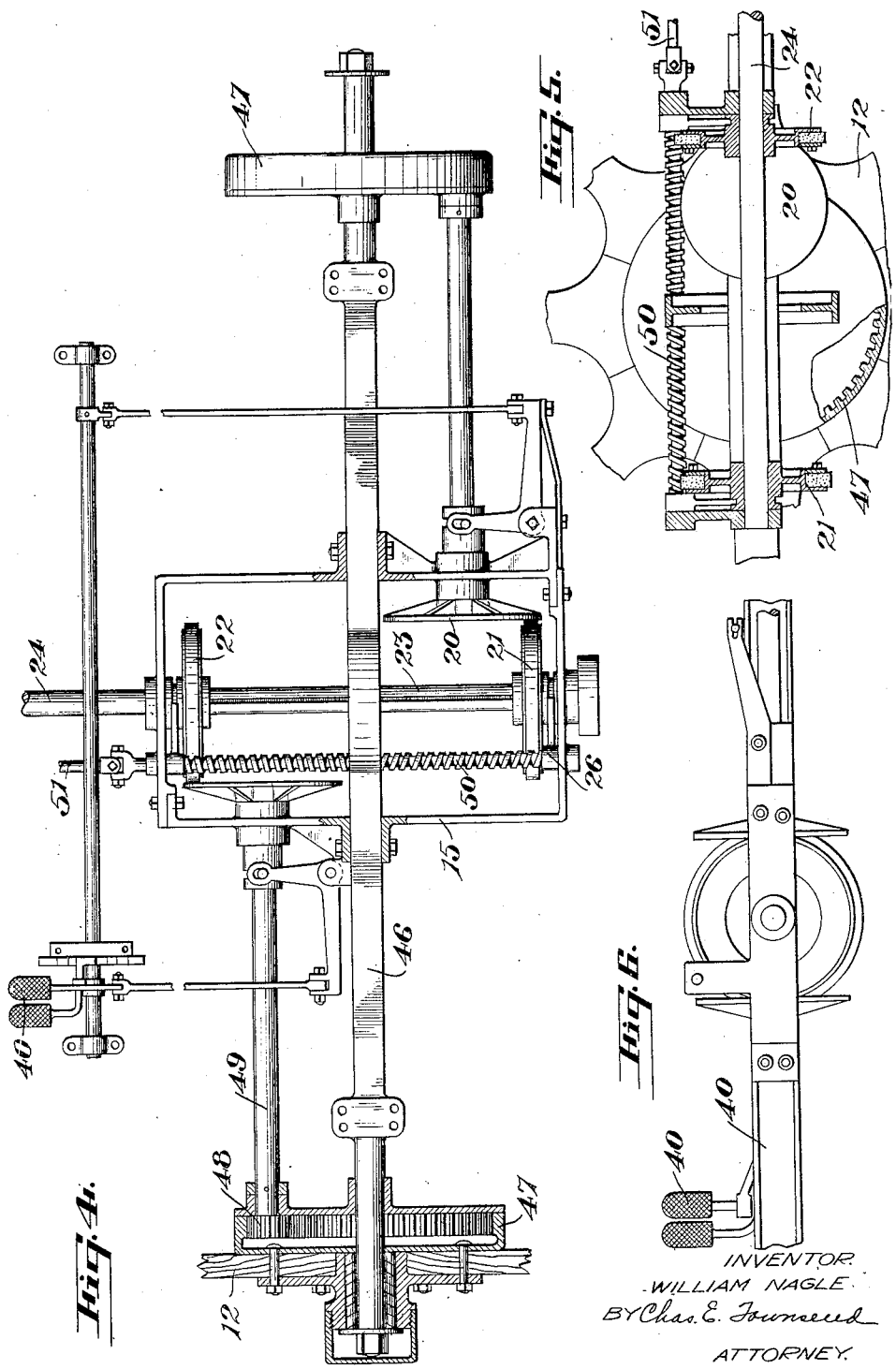

1,428,898

UNITED STATES PATENT OFFICE.

WILLIAM NAGLE, OF SAN FRANCISCO, CALIFORNIA.

FRICTION TRANSMISSION.

Application filed July 6, 1921. Serial No. 482,677.

*To all whom it may concern:*

Be it known that I, WILLIAM NAGLE, a citizen of the United States, residing at the city and county of San Francisco, and State of California, have invented new and useful Improvements in Friction Transmissions, of which the following is a specification.

This invention relates to a vehicle transmission and particularly pertains to a variable speed transmission of the friction type. It is a principal object of the present invention to provide a variable speed driving transmission for automobiles which will incorporate the transmission and axle driving mechanism in a single unit, at the same time eliminating the use of a differential gearing and providing means whereby the speed and direction of the travel of the vehicle may be instantly and optionally altered.

The present invention contemplates the use of a rear driving axle of the solid, or floating, type, which axle carries wheels at its opposite ends adapted to be separately and simultaneously driven by a variable speed friction driving mechanism. The invention is illustrated by way of example in the accompanying drawings, in which Fig. 1 is a view in horizontal section in elevation showing the present invention as adapted to a floating vehicle axle;

Fig. 2 is an enlarged transverse section through the mechanism as seen on the line 2—2, Fig. 1;

Fig. 3 is a fragmentary view in elevation showing the transmission mechanism;

Fig. 4 is a view in horizontal section in elevation showing the present invention embodied in a fixed axle structure;

Fig. 5 is an enlarged fragmentary view in transverse section showing the control mechanism;

Fig. 6 is a view in end elevation disclosing the arrangement of the parts in the form shown in Fig. 4.

Referring more particularly to Figs. 1 to 3, inclusive, of the drawing, 10 and 11 indicate live axles to the outer ends of which driving wheels 12 and 13 are secured. The axles are provided with suitable bearings within axle housings 14, which housings are carried at the opposite sides of a transmission case 15. The inner ends of the axles carry gears 16 which are keyed thereto. These gears are in constant mesh with complementary pinions 17 mounted upon disk shafts 18. These shafts are slidably supported through bearings 19 at the opposite sides of the transmission case. The shafts are rotated by friction disks 20 secured upon their inner ends and which disks are provided with flat end faces engaging friction driving wheels 21 and 22. These wheels are splined onto a driving shaft 23 which extends transversely of the axles 10 and 11 and therebetween the shaft is rotatably supported in suitable bearings in the front and rear of the transmission case 15, and is driven directly by the main drive shaft 24 of the vehicle. A variation in the driving speeds and the direction of rotation of the disks 20 is brought about by movement of the driving wheels 21 and 22.

In the form of the invention shown in Fig. 1, levers are provided to shift the wheels; while in Fig. 4 a double acting screw is used to move the driving wheels toward and away from each other. Reference being particularly had to Fig. 1, it will be noted that the driving wheels 21 and 22 are fitted with grooved hubs 25 engaged by the arms of shaft yokes 26. These yokes are carried at the outer ends of the levers 27 and 28 respectively, which levers may be simultaneously swung toward and away from each other by the movement of a hand control lever 29. This member is secured to a sleeve 30 supported on the shaft 31. An arm 32 is formed at the end of the sleeve and is provided with a connecting rod 33. This rod is secured to a pin 34 fastened to the lever 27 at a point intermediate its ends. The pin in turn engages a shackle 35 pivoted to one end of a beam 36. This beam is centrally pivoted on a stud 37, while the opposite end of the beam is pivoted to a shackle 38 connected with the lever 28 in the same relative position as shackle 35 is connected to lever 27. The ends of the levers 27 and 28 adjacent the pins 34 are pivoted to a fixed bar 39 which is secured across the transmission and which also supports the center pin 37 of the beam 36.

By this arrangement, shifting movement of the hand lever 29 will produce simultaneous movement of the levers 27 and 28, thus instantly moving the drive wheels 21 and 22 toward and away from each other.

It is highly desirable that means be provided for holding the driving wheels 21 and 22 out of engagement with the clutch disks 20 when the vehicle is standing still. This is accomplished by providing a clutch pedal 40 which is carried on the shaft 31 and operates a pair of levers 41 and 42. These levers have connecting rods 43 which are secured to bell cranks 44. The bell cranks engage pins 45 carried on the ends of shafts 18. By movement of the bell cranks, the shafts 18 may be moved through their bearings and pressure exerted upon the disks. These disks are keyed, or otherwise positively connected, to the pinions 17, thus imparting a driving movement to gears 16 and the live axles.

In the form of the invention shown in Figs. 4 to 6, inclusive, the floating axle structure is eliminated and a fixed axle 46 is provided. This axle supports drive wheels 12 and 13 at its opposite ends, these wheels being mounted free to rotate on the axle. The wheels are fitted with internal gear drums 47 driven by pinions 48. These pinions are fixed to the ends of drive shafts 49 which extend parallel to the axle and project from bearings at opposite sides of the transmission case 15. The shifting movement of the driving wheels 21 and 22 is brought about by a screw shaft 50 formed with right and left hand threads adapted to simultaneously move the shifting members 26 with the resultant movement of the drive wheels. This rod may be rotated by any suitable means connected with the end of the rod, as indicated at 51.

In the operation of either form of the present invention driving is brought about through the propeller shaft 24 to the splined shaft 23. This will simultaneously rotate the driving wheels 21 and 22, and, due to the relative positions of these wheels, to the discs 20, will cause simultaneous rotation of the driving shafts 49, or the live axles 10 and 11. When the wheels are moved across the center of the discs a reverse rotation of the driven members will take place, it being understood that the clutch levers are actuated by the pedal 40 to simultaneously force the discs inwardly against the resiliency of the spring 44', after which the pedal is locked by the lock pedal 40'. When it is desired to drive machinery on the vehicle, connections may be made with the propeller shaft 24 and the drive shaft 23, irrespective of the operation of the friction discs, making it possible to furnish power for the machinery when the vechicle is standing still, or moving. It will also be noted that by the use of the transmission mechanism applied to the rear axle of the vehicle, any necessary slippage may take place to produce the desired differential action required as the vehicle makes a turn, said action being brought about without interfering with the driving operation.

While I have shown the preferred form of my invention, it is to be understood that various changes may be made by those skilled in the art without departing from the spirit of the invention.

Having thus described my invention, what I claim and desire to secure by Letters Patent is:

1. A variable speed vehicle axle carrying traction wheels at its opposite ends; gear means for separately driving said wheels; a single drive shaft; and front and rear sets of friction gears located in advance and in rear of the axle, and interposed between the drive shaft and the said gear means, each set being composed of two friction elements, one of which is arranged to move radially in adjustment across the center of the other friction element to vary the speed and change the direction of rotation of the latter.

2. A variable speed vehicle axle carrying traction wheels at its opposite ends; gear means for separately driving said wheels; a single drive shaft; and front and rear sets of friction gears located in advance and in rear of the axle and interposed between the said drive shaft and the gear means, each set being composed of two gear elements, one of which is slidably mounted on the drive shaft and is adjustable radially across the center of the other gear element to vary the speed and change the direction of rotation of the latter element.

3. A variable speed vehicle driving axle carrying traction wheels at its opposite ends; gear means for separately driving said wheels; a driving shaft interposed between said means; friction discs directly associated with the gear means; friction wheels carried on the shaft and engaging said discs and simultaneously driving the latter; and means for simultaneously moving said wheels to produce simultaneous and variable driving speeds for the gear means, said friction wheels being slidable to opposite sides of the center of the friction discs.

4. A variable speed vehicle driving axle carrying traction wheels at its opposite ends; gear means for separately driving said wheels; a driving shaft having fixed bearings and interposed between said means; friction discs directly associated with gear means; friction wheels carried on the shaft and engaging said discs and simultaneously driving the latter; means for simultaneously moving said wheels to produce simultaneous and variable driving speeds for the gear means and for carrying the friction wheels to opposite sides of the center of the friction discs for reversing the motion; and means for optionally producing pressure on the driving wheels by the friction discs.

5. A variable speed vehicle driving axle carrying traction wheels at its opposite ends; gear means for separately driving said wheels; a driving shaft interposed between said means; friction discs directly associated with gear means; friction wheels carried on the shaft and engaging said discs and simultaneously driving the latter; means for simultaneously moving said wheels to produce simultaneous and variable driving speeds for the gear means and for carrying the friction wheels to opposite sides of the center of the friction discs for reversing the motion; means for optionally producing pressure on the driving wheels by the friction discs; and means for locking the friction members in said positions.

6. A friction transmission comprising a drive shaft, a pair of friction wheels splined on to said shaft, means for simultaneously moving said wheels toward and away from each other, and friction discs simultaneously engaged by the said friction wheels, said wheels being slidable to opposite sides of the center of the discs.

7. A friction transmission comprising a drive shaft, a pair of friction wheels splined on to said shaft, means for moving said wheels towards and away from each other, and friction discs located at opposite sides of the said shaft and simultaneously engaged and driven by the friction wheels, the latter being arranged to move to opposite sides of the centers of the friction discs for reversing the direction of rotation of the same.

8. A variable speed vehicle axle carrying traction wheels at its opposite ends, gear means for separately driving said wheels, a drive shaft having friction drive wheels located in advance and in rear of the axle, and two friction discs connected with the gear means, one of the friction discs being located forward of the axle and at one side and the other friction disc being located back of the axle and at the opposite side so that both friction discs can be engaged with the friction wheels at the same time to rotate both friction discs in the same direction, whereby the gear means will be actuated to rotate the traction wheels in the same direction, said friction wheels being shiftable toward and away from each other to change the speed and also to reverse the direction of rotation of the friction gears when the said drive wheels are shifted past the center of the friction discs.

9. A variable speed vehicle axle carrying traction wheels at its opposite ends, friction drive wheels located in advance and in rear of the axle, two friction discs connected with and adapted to actuate the traction wheels, one of the friction discs being located in advance of the axle and at one side and the other friction disc being located in rear of the axle and at the opposite side, means for simultaneously engaging the friction discs with the drive wheels, and means for shifting the drive wheels to vary the speed and to change the direction of the traction wheels.

10. A variable speed vehicle driving axle carrying traction wheels at its opposite ends, friction drive wheels located in advance and in rear of the axle, two friction discs, one of the friction discs being located forward of the axle and at one side and the other friction disc being located back of the axle and at the opposite side, gearing connecting the friction discs with the traction wheels, means for simultaneously engaging the friction wheels with the drive wheels, and means for shifting the drive wheels toward and from each other to vary the speed and change the direction of the traction wheels.

11. A variable speed vehicle driving axle carrying the traction wheels at its opposite ends, a single drive shaft provided with friction drive wheels located in advance and in rear of the axle, two friction discs provided with shafts slidably mounted and movable laterally of the vehicle, one of the friction discs being located forward of the axle and at one side and the other friction disc being located back of the axle at the opposite side, means connected with the slidable shafts for simultaneously engaging the friction discs with the friction wheels, means for shifting the friction wheels, and gearing connecting the slidable shafts with the traction wheels.

12. A variable speed driving axle carrying traction wheels at its opposite ends, a driving shaft provided with front and rear driving wheels located in advance and in rear of the axle, two cooperating friction members, one of the friction members being located forward of the axle and at one side of the driving shaft and the other friction member being located back of the axle and at the opposite side of the driving shaft, and gearing connecting the front and rear friction members with the traction wheels.

WILLIAM NAGLE.